United States Patent [19]

Chang et al.

[11] Patent Number: 5,270,411
[45] Date of Patent: Dec. 14, 1993

[54] PROCESS FOR MAKING AN ALIPHATIC POLYESTER BY COPOLYMERIZING A CYCLIC KETENE ACETAL AND AN OLEFIN AND THE POLYESTER PRODUCT THEREOF

[75] Inventors: Biau-Hung Chang, West Chester; Thomas S. Brima, Cincinnati, both of Ohio

[73] Assignee: Quantum Chemical Corporation, Cincinnati, Ohio

[21] Appl. No.: 865,521

[22] Filed: Apr. 9, 1992

[51] Int. Cl.$^5$ .................. C08F 2/06; C08F 4.04; C08F 212/06; C08F 234/02
[52] U.S. Cl. .................. 526/212; 526/218.1; 526/219; 526/347; 526/266
[58] Field of Search .................. 526/266, 218.1, 212

[56] References Cited

U.S. PATENT DOCUMENTS 4,604,455 8/1986 MacLeay .................. 534/587

FOREIGN PATENT DOCUMENTS 4081450 3/1992 Japan.

OTHER PUBLICATIONS

Taskinen et al., *Tetrahydron*, 34, 2365 (1978).
Bailey et al., *J. Poly. Sci.: Poly. Chem. Ed.*, 20, 3021 (1982).
Bailey et al., *A.C.S. Poly. Chem. Div., Preprints*, 27 (1), 58 (1984).
William J. Bailey and Benjamin Gapud, ACS Poly. Chem. Div., Preprints 27(1) 58, 1984.

*Primary Examiner*—Joseph L. Schofer
*Assistant Examiner*—Wu C. Cheng
*Attorney, Agent, or Firm*—Kenneth D. Tremain; Gerald A. Baracka

[57] ABSTRACT

A process for making a biodegradable aliphatic polyester and the polyester so formed is disclosed. The process comprises copolymerizing a cyclic ketene acetal having the structural formula

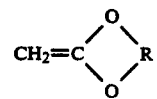

where R is a bivalent moiety, and an olefin. This copolymerization occurs in a solution of a tertiary alcohol and in the presence of a free radical initiating effective amount of a compound having the structural formula

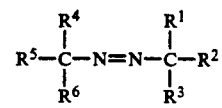

where $R^1$, $R^2$, $R^3$, $R^4$, $R^5$ and $R^6$ are the same or different and are $C_1$-$C_{20}$ hydrocarbyl, $C_1$-$C_{20}$ hydrocarbyloxy, cyano, halogen, carboxy, carboalkoxy, carbonyl or formyl. The copolymerization occurs at a temperature in the range of between in excess of ambient temperature and less than 100° C. and at a pressure in excess of about 2,000 psi. The aliphatic polyester product of this process contains repeating structural units of the formula

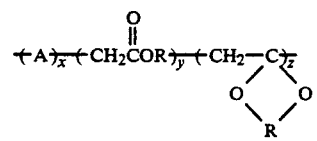

where A is a radical of a polymerized olefinic monomer; R is a bivalent moiety; x is a positive integer; and y and z are 0 or a positive integer with the proviso that the sum of y and z is at least 1, ratio of x to y is in the range of between about 3:1 and about 200,000:1, the ratio of z to y is in the range of between 0 and about 0.5:1; and said polyester has a weight average molecular weight of at least about 40,000.

35 Claims, No Drawings

PROCESS FOR MAKING AN ALIPHATIC POLYESTER BY COPOLYMERIZING A CYCLIC KETENE ACETAL AND AN OLEFIN AND THE POLYESTER PRODUCT THEREOF

BACKGROUND OF THE DISCLOSURE

1. Field of the Invention

The development of biodegradable plastics has accelerated in recent years with the concurrent appreciation of the environmental damage caused by commercially important plastics. That is, the enormous increase in volume of waste non-biodegradable plastics has rapidly accelerated the filling up of waste disposal sites emphasizing the need for the replacement of non-biodegradable plastics with biodegradable plastics which serve the same functions as do presently available commercial non-biodegradable plastics.

Of the commercially employed plastics, polyethylene probably represents the single most common plastic. As such, the development of biodegradable polyethylene substitutes has been of paramount concern. A particularly effective biodegradable polyethylene substitute is the aliphatic polyester having the repeating structural unit

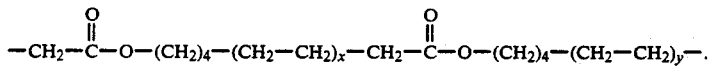

There copolymer and analogous polymers having the same generic repeating structural unit produce an excellent polyethlene substitute which is biodegradable. That is, a polymer having this or an analogous repeating structural unit is employable in applications usually served by non-biodegradable polyethylene.

A major problem associated with aliphatic polyesters having biodegradable characteristics is low molecular weight. Typically, such synthesized aliphatic polyesters are characterized by molecular weights of about 5,000. Those skilled in the art are aware that this low degree of polymerization is a major factor preventing significant replacement of polyethylene by biodegradable polymers.

Obviously, the above remarks point out the need in the art for new processes to develop biodegradable polymers of much higher molecular weight which can provide the utility presently provided by commercial non-biodegradable polymers such as polyethylene.

2. Background of the Prior Art

The polymerization process of the present invention involves the copolymerization of a cyclic ketene acetal with an olefin. Of course, olefins are numbered among the most commercially available types of monomer. However, cyclic ketene acetals are not commercially available. However, synthesis of such compounds is known in the art. E. Tashinen et al., *Tetrahydron*, 34, 2365 (1978); W. J. Bailey et al., *J. Polymer Sci.: Poly. Chem. Ed.*, 20, 3021-3030 (1982); and U.S. Pat. No. 4,530,746 to Azuma et al. describe methods for producing cyclic ketene acetals. In these references the acetal monomer is synthesized in a two step process involving acetal exchange followed by dehydrohalogenation. The product is thereupon purified by distillation.

The second of the above-mentioned references, Bailey et al., *J. Polymer Sci.: Poly. Chem. Ed.*, 20, 3021 (1982), is principally directed to the homopolymerization of one such cyclic ketene acetal, 2-methylene-1,3-dioxepane. This cyclic ketene acetal, however, is mentioned in one copolymerization reaction, the copolymerization of 2-methylene-1,3-dioxepane and styrene, a non-olefin. That copolymerization reaction occurs in the presence of a free radical initiating effective amount of di-t-butyl peroxide at a temperature of 120° C. in the absence of a solvent.

Bailey et al., *ACS, Poly. Chem. Div., Preprints*, 27 (1), 58 (1984) describes the copolymerization of ethylene and 2-methylene-1,3-dioxepane at a temperature of 120° C. in the presence of a free radical initiating effective amount of di-t-butylperoxide. This polymerization reaction is conducted in a solution of cyclohexane. The copolymer product of this polymerization reaction is characterized by a weight average molecular weight in the range of about 5,000 and a melting point of 100° C. to 105° C.

U.S. Patent 4,530,746 to Azuma et al., mentioned above, is directed to a photosensitive resin composition which is synthesized by contacting a cyclic ketene acetal such as 2-methylene-1,3-dioxepane, at least one compound selected from the group consisting of epoxyacrylate resins, 1,2-polybutadiene resins, polyester resins and organo-polysiloxanes, all having one or more acryloyloxy or methacryloyloxy groups in their molecular end or ends, and a photosensitizer. This composition is characterized by very little shrinkage. Furthermore, the resulting coating film is characterized by excellent adhesivity and mechanical strength.

BRIEF SUMMARY OF THE INVENTION

The present invention is directed to a new process of synthesizing an aliphatic polyester which is biodegradable but which is characterized by physical properties which permit it to be substituted for polyethylene in the many applications to which that resin is employed. Thus, the aliphatic polyester prepared in the process of the present invention is employed in molded articles, film products and extruded devices. This is possible in that the process of this invention is characterized by the production of aliphatic polyesters having higher degrees of polymerization, as manifested by weight average and number average molecular weight, than is obtained by the processes of the prior art.

In accordance with the present invention a process for making an aliphatic polyester is set forth. In this process a cyclic ketene acetal having the structural formula

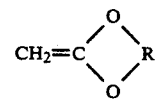

where R is a bivalent moiety, is copolymerized with an olefin. The copolymerization occurs in a solution of a tertiary alcohol and in the presence of a free radical initiating effective amount of a compound having the structural formula

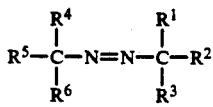

where $R^1$, $R^2$, $R^3$, $R^4$, $R^5$ and $R^6$ are the same or different and are $C_1$-$C_{20}$ hydrocarbyl, $C_2$-$C_{20}$ hydrocarbyloxy, cyano, halogen, carboxy, carboalkoxy, carbonyl or formyl. The process is further characterized by occurring at a temperature in the range of between above about ambient temperature and less than 100° C. and a pressure above about 2,000 psi.

In further accordance with the present invention an aliphatic polyester, produced in the process of this invention, is provided. This aliphatic polyester is comprised of structural units of the formula

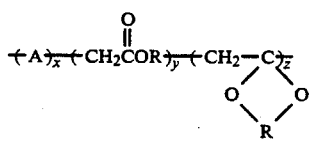

where A is a radical of the polymerized olefin monomer; R is a bivalent moiety; x is a positive integer; and y and z are 0 or a positive integer with the proviso that the sum of y and z is at least 1. The ratio of x to y is in the range of between about 3:1 and about 200,000:1 and the ratio of z to y is in the range of between 0 and about 0.5:1. The aliphatic polyester is characterized by a weight average molecular weight of at least about 40,000.

DETAILED DESCRIPTION

The process of the present invention involves the preparation of an aliphatic polyester having biodegradable cyclic ketene acetal having the structural formula

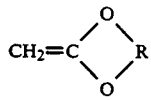
(I)

where R is a bivalent moiety.

In a preferred embodiment the compound having the structural formula I is characterized by R being alkylene or alkenylene containing between 2 and about 20 carbon atoms. The alkylene or alkenylene may also include in the main chain or in a side chain at least one atom selected from the group consisting of oxygen, sulfur and nitrogen.

More preferably, the cyclic ketene acetal has the structural formula I where R is alkylene or alkenylene containing between 2 and about 8 carbon atoms.

Still more preferably, the cyclic ketene acetal has the structural formula I where R is alkylene containing between 2 and about 6 carbon atoms. Thus, in this still more preferred embodiment the cyclic ketene acetal may be 2-methylene-1,2dioxolane, 2-methylene-1,3-dioxane, 2-methylene-1,3-dioxepane, 2-methylene-1,3-dioxocane or 2-methylene-1,3-dioxonane. Of these preferred cyclic ketone acetals, 2-methylene-1,3-dioxepane is most preferred.

The cyclic ketene acetals having the structural formula I are not commercially available. However, methods of preparing compounds having the structural formula I are set forth in E. Tashinen et al., *Tetrahydron*, 34, 2365 (1978), W. J. Bailey et al., *J. Poly. Sci.: Poly. Chem. Ed.*, 20, 3021 (1982) and U.S. Pat. No. 4,530,746 which publications are incorporated herein by reference.

One or more olefins are copolymerized with the above-described cyclic ketene acetals. Preferably, these olefins contain between 2 and about 10 carbon atoms. More preferably, the olefin is an alpha-olefin containing between 2 and about 8 carbon atoms. Still more preferably, the olefinic monomer utilized in the process of the present invention is an alpha-olefin containing between 2 and about 4 carbon atoms. Even still more preferably, the alpha-olefin utilized a monomer in the copolymerization is ethylene or propylene. Most preferably, the olefin is ethylene.

The process of the present invention is limited by a further novel requirement. That is, the copolymerization reaction of the present process occurs in a solution of a tertiary alcohol. Preferably, the tertiary alcohol has the structural formula

(II)

where $R^7$, $R^8$ and $R^9$ are the same or different and are $C_1$-$C_{20}$ hydrocarbyl. More preferably, the tertiary alcohol has the structural formula II where $R^7$, $R^8$ and $R^9$ are the same or different and are $C_1$ to $C_{20}$ hydrocarbyl with the proviso that at least two of the radicals are alkyl. Still more preferably, the tertiary alcohol has the structural formula II where $R^7$, $R^8$ and $R^9$ are the same of different and are $C_1$-$C_{10}$ alkyl. Even still more preferably, the tertiary alcohol has the structural formula II where $R^7$, $R^8$ and $R^9$ are the same or different and are $C_1$-$C_4$ alkyl. Yet even still more preferably, the tertiary alcohol has the structural formula II where $R^7$, $R^8$ and $R^9$ are the same and are $C_1$-$C_3$ alkyl. Most preferably, $R^7$, $R^8$ and $R^9$ are methyl whereby the tertiary alcohol is tertiary butyl alcohol, also referred to herein as t-butyl alcohol.

The copolymerization reaction uniquely occurs in the presence of a free radical initiating effective amount of a compound having the structural formula

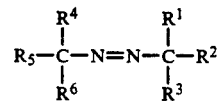
(III)

where $R^1$, $R^2$, $R^3$, $R^4$, $R^5$ and $R^6$ are the same or different and are $C_1$-$C_{20}$ hydrocarbyl, $C_1$-$C_{20}$ hydrocarbyloxy, cyano, halogen, carboxy, carboalkoxy, carbonyl or formyl.

Preferably, the free radical initiator is a compound having the structural formula III where $R^1$, $R^2$, $R^3$, $R^4$, $R^5$ and $R^6$ are the same or different and are $C_1$-$C_{20}$ alkyl or cyano.

More preferably, the free radical initiator has the structural formula III where $R^1$, $R^2$, $R^3$, $R^4$, $R^5$ and $R^6$ are the same or different and are $C_1$-$C_{10}$ alkyl.

Still more preferably, the free radical initiator has the structural formula III where $R^1$, $R^2$, $R^3$, $R^4$, $R^5$ and $R^6$ are the same or different and are $C_1$-$C_6$ alkyl.

Even still more preferably, the free radical initiator has the structural formula III where $R^1$, $R^2$, $R^3$, $R^4$, $R^5$ and $R^6$ are the same or different and are $C_1-C_4$ alkyl.

Yet still more preferably, the free radical initiator of the present invention is a compound having the structural formula III where $R^1$, $R^2$, $R^3$, $R^5$, $R^5$ and $R^6$ are the same and are $C_1-C_2$ alkyl. Most preferably, the free radical initiator is azobis(isobutyronitrile), hereinafter referred to as AIBN.

The process of the present application is characterized by a polymerization reaction whose thermodynamic conditions are less extreme than those employed in the preparation of non-biodegradable polyethylene utilized in the same applications as those employed by the polymerization product of the present process. That is, the usual ethylene polymerization process occurs at temperatures and pressure far in excess of those employed in the process of the present application.

In the process of the present invention the copolymerization of a cyclic ketene acetal and an olefin occurs at a temperature in the range of between in excess of ambient temperature, i.e., about 25° C., and less than 100° C. Preferably, the copolymerization process occurs at temperature in the range of between about 40° C. and about 90° C. Still more preferably, this temperature is in the range of between about 50° C. and about 80° C. Most preferably, the temperature of the copolymerization reaction is in the range of between about 65° C. and about 75° C.

As in the case of the temperature, the pressure of the copolymerization reaction is far less extreme than is the pressure required to produce non-biodegradable polyethylene. Thus, the pressure at which the process of the present invention occurs is at least above about 2,000 psi. Preferably, the pressure of the present copolymerization reaction is at least about 3,000 psi. More preferably, the polymerization reaction occurs at a pressure in the range of between about 3,200 psi and about 4,500 psi. Still more preferably, the pressure of the process of the present invention is in the range of between about 3,800 psi and about 4,200 psi.

The present invention also encompasses the aliphatic polyester product of the process of this invention. This aliphatic polyester is comprised of structural units having the formula

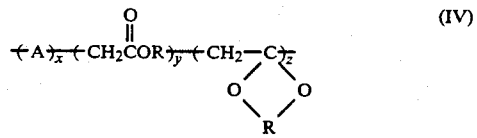

where A is a radical of the polymerized olefin monomer; R is a bivalent moiety; x is a positive integer; and y and z are 0 or a positive integer with the provison that the sum of y and z is at least 1, the ratio of x to y is in the range of between about 3:1 and about 200,000:1 and the ratio of z to y is in the range of between 0 and about 0.5:1.

Preferably, the aliphatic polyester is comprised of structural units of the formula IV where A is an alkylene containing 2 to about 10 carbon atoms; R is alkylene or alkenylene containing between 2 and about 20 carbon atoms which may include, in the main chain or in a side chain thereof, at least one atom selected from the group consisting of oxygen, sulfur and nitrogen; and x, y and z are integers such that the ratio of x to y is in the range of between about 5:1 and about 100,000:1 and the ratio of z to y is in the range of between about 0.0001:1 and about 0.35:1.

More preferably, the aliphatic polyester of the present invention is defined by the structural formula IV where A is an alkylene of 2 to about 8 carbon atoms; R is an alkylene or an alkenylene containing 2 to about 8 carbon atoms; the ratio of x to y is in the range of between about 10:1 and about 2,000:1; and the ratio of z to y is in the range of between about 0.001:1 and about 0.2:1.

Still more preferably, the aliphatic polyester is characterized by the repeating structural unit defined by formula IV where A is an alkylene containing 2 to about 6 carbon atoms; and R is an alkylene containing 2 to about 6 carbon atoms.

Most preferably, the aliphatic polyester is characterized by the repeating structural unit defined by formula IV where A is ethylene; and R is alkylene containing 4 carbon atoms.

The aliphatic polyester of the present invention has a weight average molecular weight of at least about 40,000. Preferably, the weight average molecular weight of the aliphatic polyester having the repeating structural units corresponding to structural formula IV is at least about 60,000. More preferably, the aliphatic polyester is in the range of between about 60,000 and about 200,000. Still more preferably, the aliphatic polyester containing the repeating structural units IV has a weight average molecular weight of between about 60,000 and about 150,000. Even still more preferably, the weight average molecular weight of the aliphatic polyester is in the range of between about 70,000 and about 125,000.

The following examples are given to illustrate the present invention. Because these examples are given for illustrative purposes only, the scope of the present invention should not be limited thereto.

EXAMPLE 1

A 300 ml. autoclave was charged with a solution of 2-methylene-1,3-dioxepane (5.2 g.) in t-butyl alcohol (80 ml.) To this solution was added azobis(isobutyronitrile) (AIBN) (50 mg.). These materials were introduced into the autoclave under an atmosphere of nitrogen. The autoclave was sealed and the nitrogen atmosphere was replaced with gaseous ethylene introduced into the autoclave such that the pressure therein was raised to 4000 psi. The temperature was correspondingly increased to 70° C. The autoclave was maintained under these conditions for 8 hours. Thereupon the polymerization was stopped and the autoclave opened to recover the product of this copolymerization.

The polymeric product of this copolymerization reaction was weighed and analyzed by infrared spectroscopy and elemental analysis to determine the percentage of the polymer that was ester. It was found that the yield of this polymerization was 5.62 g. and that the ester constituency was 1.44%, based on the total weight of the polymeric product. This result established that the product was an aliphatic polyester.

The polymer was analyzed by gel permeation chromatography to determine its weight average molecular weight as well as its number average molecular weight. It was found that the weight average molecular weight of the aliphatic polyester product of this example was 145,000. Its number average molecular weight was 15,100. Its ester content was 1.44%. Those skilled in the art are aware that this concentration establishes that the required ratios of x to y and z to y in repeating structural formula IV are thus met.

This example is summarized in the Table.

EXAMPLE 2

Example 1 was reproduced but for the production in the amount of AIBN introduced into the autoclave. In this example 10 mg. was charged into the autoclave rather than the 50 mg. included in Example 1.

The results of this example are summarized in the Table.

EXAMPLE 3

Example 1 was identically reproduced except for the doubling of the amount of 2-methylene-1,3-dioxepane. In this example this cyclic ketene acetal was introduced in an amount of 10.4 g. rather than the 5.2 g. of Example 1. Otherwise, this example was identical to Example 1.

The results of this example are summarized in the Table.

EXAMPLE 4

Example 1 was repeated but for the amount of the cyclic ketene acetal. In this example, four times the amount of 2-methylene-1,3-dioxepane used in Example 1 was utilized. In addition, the amount of the t-butyl alcohol solvent was somewhat reduced. In this example, 20.8 g. of 2-methylene-1,3-dioxepane was dissolved in 60 ml. of t-butyl alcohol rather than the 80 ml. employed in Example 1.

The results of this example are summarized in the Table.

EXAMPLE 5

Example 1 was reproduced except for the temperature and duration of the copolymerization reaction. In this example the temperature of the reaction was increased to 90° C. but the duration of the copolymerization was reduced to 4 hours.

The results of this example are included in the Table.

EXAMPLE 6

Example 1 was reproduced but for two changes. The amount of the initiator AIBN was quadrupled to 200 mg. However, the duration of the copolymerization run was cut in half to 4 hours.

The results of this example are included in the Table.

EXAMPLE 7

Example 1 was reproduced except for the time and temperature of the copolymerization reaction. In this example the temperature was raised to 80° C. from 70° C. but the duration of the run was reduced to 5 hours from 8 hours.

The results of this run are included in the Table.

EXAMPLE 8

Example 1 was repeated but for the marked increase in initiator amount and reduction in duration of the copolymerization reaction. In this example the amount of AIBN was increased eight times to 400 mg. but the duration of the run was reduced by half to 4 hours.

The results of this example are included in the Table.

EXAMPLE 9

Example 1 was repeated with several changes to the amounts of the components employed in the copolymerization as well as the thermodynamic conditions under which the copolymerization was conducted. Thus, the amount of the cyclic ketene acetal, 2-methylene-1,3-dioxepane, was quadrupled to 20.8 g. as was the amount of the AIBN initiator which was increased to 200 mg. The amount of the solvent, t-butyl alcohol, was reduced by 25% to 60 ml. The temperature of the polymerization reaction was increased to 80° C. but the duration of the copolymerization was reduced to 5 hours.

A summary of this run is included in the Table.

EXAMPLE 10

Example 1 was repeated except for the marked increase in the amounts of 2-methylene-1,3-dioxepane and the AIBN initiator. The 2-methylene-1-3-dioxepane cyclic ketene acetal amount was increased by 8 times to 41.6 mg. and the AIBN amount was multiplied by 4 times to 200 mg. The duration of the run was cut in half to four hours.

The results of this example are tabulated in the Table.

EXAMPLE 11

Example 1 was identically reproduced but for the volume of t-butyl alcohol solvent employed. In this example 50 ml. of t-butyl alcohol was utilized compared to the 80 ml. utilized in Example 1. The conditions under which the copolymerization reaction was conducted was also subject to a minor variation, the reduction of its duration to 7 hours rather than the 8 hours utilized in Example 1.

The results of this example are included in the Table.

In reviewing these results it is noted that the reduction in the weight average molecular weight and number average molecular weight of the polymeric product of this run is ascribed to the lesser volume of reaction mixture included in the autoclave. As stated in Example 1, weight average and number average molecular weights were determined by gel permeation chromatography. It is postulated that the thermocouple employed in the autoclave was not totally immersed in the liquid mixture when the run was made. This may well have been caused by the 30 ml. decrease in the volume of tertiary butyl alcohol employed in this example compared to Example 1. Obviously, this decrease in volume lowered the liquid level, which may have affected the accuracy of the determination of reaction temperature.

COMPARATIVE EXAMPLE 1

Example 1 was identically reproduced but for the pressure under which the copolymerization reaction was conducted. Instead of the 4,000 psi pressure utilized in the 8 hour copolymerization run of Example 1, this example was conducted at a pressure of 1,000 psi for 7 hours.

The results of this example are included in the Table.

COMPARATIVE EXAMPLE 2

Example 1 was identically reproduced except for the identity of the solvent in which the 2-methylene-1,3-dioxepane was dissolved. In this example, 80 ml. of cyclohexane replaced the 80 ml. of t-butyl alcohol of Example 1 as the solvent in which the copolymerization was conducted. In addition, the term of the copolymerization was reduced to 7 hours. Example 1 involved a copolymerization reaction of 8 hours.

The results of this example are summarized in the Table.

COMPARATIVE EXAMPLE 3

Example 1 was again reproduced except for the identity of the solvent. In this example the t-butyl alcohol (80 ml.) of Example 1 was replaced with an equal volume of methanol (80 ml.). The results of this example are included in the Table.

COMPARATIVE EXAMPLE 4

Example 1 was reproduced except for the substitution of the free radical initiator AIBN with another well known free radical initiator, benzoyl peroxide. In addition, the amount of the initiator was changed. In this comparative example the 50 mg. of AIBN was replaced with 80 mg. of benzoyl peroxide. In order to ensure that a measurable yield was obtained, the duration of the polymerization run was increased by 50% to 12 hours.

The results of this example are included in the Table.

COMPARATIVE EXAMPLE 5

Example 1 was reproduced except for the temperature of the copolymerization reaction. In this comparative example the temperature was raised 30° C. above the temperature at which Example 1 was conducted to a temperature of 100° C. A summary of this example is included in the Table.

COMPARATIVE EXAMPLE 6

Example 1 was reproduced except for a change in the conditions at which the copolymerization was conducted. In this comparative example the inclusion of a solvent was eliminated. Instead, the amount of the cyclic ketene acetal monomer, liquid methylene-1,3-dioxepane, was increased to 80.0 g. In addition, the amount of the AIBN initiator was doubled to 100 gm.

The results of this run are included in the Table.

COMPARATIVE EXAMPLE 7

Example 1 was identically reproduced but for the pressure of the copolymerization reaction. The pressure in the autoclave during copolymerization of this comparative example was reduced by half to 2,000 psi. The results of this run are included in the Table.

COMPARATIVE EXAMPLE 8

An example in accordance with the procedure employed in W. J. Bailey et al., ACS, Symposium Series, Polymer Stabilization and Degradation, Klienchuk ed. (1985) was reproduced. In this comparative example 2-methylene-1,3-dioxepane (10.4 g.) was dissolved in cyclohexane (100 ml.). To this was added the free radical generating initiator di-t-butylperoxide (1.1 g.) was added. The thus charged autoclave, identical to the autoclave employed in Example 1, was pressurized with ethylene at 4000 psi and allowed to copolymerize for two hours at 135° C.

The results of this run are included in the Table.

COMPARATIVE EXAMPLE 9

Comparative Example 8 was reproduced in all details but for the reduction in the amount of the monomer -methylene-1,3-dioxepane. In this example the 2-methylene-1,3-dioxepane amount was 5.2 g., identical to the amount employed in Example 1.

The results of this run are concluded in the Table.

TABLE

| | | | Reaction Conditions | | | | Polymeric Product | | |
|---|---|---|---|---|---|---|---|---|---|
| Ex. No. | CKA, g.[1] | $CH_2=CH_2$ Pressure, psi | Solvent, ml. | Initiator, mg. | Temp, °C. | Time, hr. | Yield, g. | Ester, %[2] | $M_w$[3] | $M_n$[4] |
| 1 | 5.2 | 4,000 | t-BuOH, 80 | AIBN, 50 | 70 | 8 | 5.62 | 1.44 | 145,100 | 15,100 |
| 2 | 5.2 | 4,000 | t-BuOH, 80 | AIBN, 10 | 70 | 8 | 1.89 | 1.31 | 81,400 | 17,400 |
| 3 | 10.4 | 4,000 | t-BuOH, 80 | AIBN, 50 | 70 | 8 | 3.09 | 2.72 | 131,200 | 15,280 |
| 4 | 20.8 | 4,000 | t-BuOH, 60 | AIBN, 50 | 70 | 8 | 3.75 | 4.46 | 104,900 | 14,410 |
| 5 | 5.2 | 4,000 | t-BuOH, 80 | AIBN, 50 | 90 | 4 | 7.95 | 2.64 | 94,010 | 14,830 |
| 6 | 5.2 | 4,000 | t-BuOH, 80 | AIBN, 200 | 70 | 4 | 5.60 | 1.46 | 118,300 | 11,280 |
| 7 | 5.2 | 4,000 | t-BuOH, 80 | AIBN, 50 | 80 | 5 | 5.75 | 1.51 | 99,420 | 10,040 |
| 8 | 5.2 | 4,000 | t-BuOH, 80 | AIBN, 400 | 70 | 4 | 9.12 | 1.55 | 133,600 | 9,744 |
| 9 | 20.8 | 4,000 | t-BuOH, 80 | AIBN, 200 | 80 | 5 | 19.76 | 4.56 | 70,780 | 7,774 |
| 10 | 41.6 | 4,000 | t-BuOH, 80 | AIBN, 200 | 70 | 4 | 8.02 | 7.07 | 59,670 | 12,070 |
| 11 | 5.2 | 4,000 | t-BuOH, 50 | AIBN, 50 | 70 | 7 | 1.55 | 2.06 | 23,520 | 7,819 |
| CE1 | 5.2 | 1,000 | t-BuOH, 80 | AIBN, 50 | 70 | 7 | 1.00 | 8.37 | 5,138 | 2,434 |
| CE2 | 5.2 | 4,000 | Cyclohexane, 80 | AIBN, 50 | 70 | 7 | 0.15 | 4.22 | 4,806 | 1,566 |
| CE3 | 5.2 | 4,000 | Methanol, 80 | AIBN, 50 | 70 | 8 | 0.80 | 1.17 | 9,291 | 3,624 |
| CE4 | 5.2 | 4,000 | t-BuOH, 80 | Benz. Per., 80 | 70 | 12 | 0.40 | 3.16 | 26,510 | 11,050 |
| CE5 | 5.2 | 4,000 | t-BuOH, 50 | AIBN, 50 | 100 | 8 | 4.82 | 1.16 | 11,420 | 5,288 |
| CE6 | 80.0 | 4,000 | None | AIBN, 100 | 70 | 8 | 15.60 | 9.28 | 24,300 | 11,080 |
| CE7 | 5.2 | 2,000 | t-BuOH, 80 | AIBN, 50 | 70 | 8 | 1.70 | Note 5 | 28,100 | 8,975 |
| CE8 | 10.4 | 4,000 | Cyclohexane, 100 | Bu. Perox., 1100 | 135 | 2 | 21.0 | 2.80 | 3,800 | 1,800 |
| CE9 | 5.2 | 4,000 | Cyclohexane, 100 | Bu. Perox., 1100 | 135 | 2 | 18.8 | 3.40 | 1,500 | 800 |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for preparing an aliphatic polyester comprising copolymerizing a cyclic ketene acetal having the structural formula

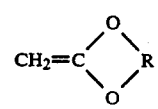

where R is a bivalent moiety, and an olefin, said copolymerization occurring in the presence of a tertiary alcohol solvent and a free radical initiating effective amount of a compound having the structural formula

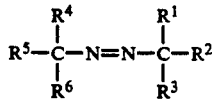

where $R^1$, $R^2$, $R^3$, $R^4$, $R^5$ and $R^6$ are the same or different and are $C_1$-$C_{20}$ hydrocarbyl, $C_1$-$C_{20}$ hydrocarbyloxy, cyano, halogen, carboxy, carboalkoxy, carbonyl or formyl, said copolymerization occurring at a temperature in the range of between in excess of ambient and less than 100° C. and at a pressure above about 2,000 psi.

2. A process in accordance with claim 1 wherein R is alkylene or alkenylene.

3. A process in accordance with claim 2 wherein R is alkylene or alkenylene containing between 2 and about 20 carbon atoms.

4. A process in accordance with claim 3 wherein said alkylene or alkenylene includes at least one atom selected from the group consisting of oxygen, sulfur and nitrogen.

5. A process in accordance with claim 3 wherein R is alkylene or alkenylene containing between 2 and about 8 carbon atoms.

6. A process in accordance with claim 5 wherein R is alkylene containing between 2 and about 6 carbon atoms.

7. A process in accordance with claim 6 wherein said cyclic ketene acetal is 2-methylene-1,3-dioxepane.

8. A process in accordance with claim 1 wherein said olefin contains between 2 and about 10 carbon atoms.

9. A process in accordance with claim 8 wherein said olefin is an alpha-olefin containing between 2 and about carbon atoms.

10. A process in accordance with claim 9 wherein said olefin is an alpha-olefin containing between 2 and about carbon atoms.

11. A process in accordance with claim 10 wherein said alpha-olefin is ethylene.

12. A process in accordance with claim 1 wherein $R^1$, $R^2$, $R^3$, $R^4$, $R^5$ and $R^6$ are the same or different and are to $C_1$-$C_{20}$ alkyl or cyano.

13. A process in accordance with claim 12 wherein $R^1$, $R^2$, $R^3$, $R^4$, $R^5$ and $R^6$ are the same or different and are $C_1$-$C_{10}$ alkyl.

14. A process in accordance with claim 13 wherein $R^1$, $R^2$, $R^3$, $R_4$, $R^5$ and $R^6$ are the same or different and are $C_1$-$C_6$ alkyl.

15. A process in accordance with claim 14 wherein $R^1$, $R^2$, $R^3$, $R^4$, $R^5$ and $R^6$ are the same and are $C_1$-$C_4$ alkyl.

16. A process in accordance with claim 15 wherein said free radical initiator is azobis(isobutyronitrile).

17. A process in accordance with claim 1 wherein said tertiary alcohol has the structural formula

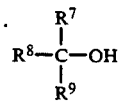

where $R^7$, $R^8$ and $R^9$ are the same or different and are $C_1$-$C_{20}$ hydrocarbyl.

18. A process in accordance with claim 17 wherein at least two of $R^7$, $R^8$ and $R^9$ are the same or different and are $C_1$-$C_{20}$ alkyl.

19. A process in accordance with claim 18 wherein $R^7$, $R^8$ and $R^9$ are the same or different and are $C_1$-$C_{10}$ alkyl.

20. A process in accordance with claim 19 wherein $R^7$, $R^8$ and $R^9$ are the same or different and are $C_1$-$C_4$ alkyl.

21. A process in accordance with claim 20 wherein $R^7$, $R^8$ and $R^9$ are the same and are $C_1$-$C_3$ alkyl.

22. A process in accordance with claim 21 wherein said tertiary alcohol is t-butyl alcohol.

23. A process in accordance with claim 1 wherein said copolymerization occurs at a temperature in the range of between about 40° C. and about 90° C. and at a pressure of at least about 3,000 psi.

24. A process in accordance with claim 23 wherein said copolymerization occurs at a temperature in the range of between about 50° C. and about 80° C. and at a pressure in the range of between about 3,200 psi and about 4,500 psi.

25. A process in accordance with claim 24 wherein said copolymerization occurs at a temperature in the range of between about 65° C. and about 75° C. and at a pressure in the range of between about 3,800 psi and about 4,200 psi.

26. A process for preparing an aliphatic polyester comprising copolymerizing a cyclic ketene acetal having the structural formula

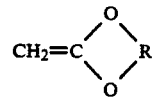

where R is alkylene or alkenylene containing between 2 and about 20 carbon atoms and an olefin containing between 2 and about 10 carbon atoms in the presence of a tertiary alcohol having the structural formula

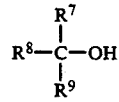

where $R^7$, $R^8$ and $R^9$ are the same or different and are $C_1$-$C_{20}$ hydrocarbyl and a free radical generating effective amount of a compound having the structural formula

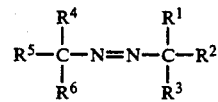

where $R^1$, $R^2$, $R^3$, $R^4$, $R^5$ and $R^6$ are the same or different and are $C_1$ to $C_{20}$ alkyl or cyano, said copolymerization occurring at a temperature in the range of between above about 25° C. and less than about 100° C. and at a pressure of above about 2,000 psi.

27. A process in accordance with claim 26 wherein R is alkylene containing between 2 and about 8 carbon atoms; said olefin is an alpha-olefin containing between 2 and about 8 carbon atoms; at least two of $R^7$, $R^8$ and $R^9$ are the same or different and are $C_1$-$C_{20}$ alkyl; $R^1$, $R^2$, $R^3$, $R^4$, $R^5$ and $R^6$ are the same or different and are $C_1$-$C_{10}$ alkyl; and said copolymerization occurring at a temperature in the range of between about 40° C. and about 90° C. and at a pressure of at least about 3,000 psi.

28. A process in accordance with claim 27 wherein R is alkylene containing between 2 and about 6 carbon atoms; said olefin is an alpha-olefin containing between 2 and about 4 carbon atoms; $R^7$, $R^8$ and $R^9$ are the same or different and are $C_1-C_{10}$ alkyl; $R^1$, $R^2$, $R^3$, $R^4$, $R^5$ and $R^6$ are the same or different and are $C_1-C_6$ alkyl; and said copolymerization occurring at a temperature in the range of between about 65° C. and about 75° C. and at a pressure in the range of between about 3,200 psi and about 4,500 psi.

29. A process in accordance with claim 28 wherein said cyclic ketene acetal is 2-methylene-1,3-dioxepane; said olefin is ethylene; $R^7$, $R^8$ and $R^9$ are the same or different and are $C_1-C_4$ alkyl; $R^1$, $R^2$, $R^3$, $R^4$ and $R^6$ are the same or different and are $C_1-C_6$ alkyl; and said copolymerization occurring at a pressure in the range of between about 3,800 psi and about 4,200 psi.

30. A process in accordance with claim 29 wherein said tertiary alcohol is tertiarybutyl alcohol and said free radical initiating compound is azobis(isobutyronitrile).

31. An aliphatic polyester comprising structural units of the formula

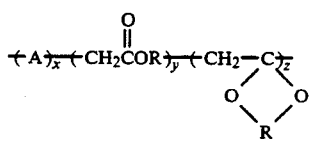

where A is a radical of a polymerized olefinic monomer; R is a bivalent moiety; x is a positive integer; y and z are 0 or a positive integer with the proviso that the sum of y and z is at least 1, the ratio of x to y is in the range of between about 3:1 and about 200,000:1 and the ratio of z to y is in the range of between 0 and about 0.5:1; and said polyester has a weight average molecular weight of at least about 40,000.

32. An aliphatic polyester in accordance with claim 31 wherein A is an alkylene containing 2 to about 10 carbon atoms; R is alkylene or alkenylene containing between 2 and about 20 carbon atoms which may include, in the main chain or in a side chain thereof, at least one atom selected from the group consisting of oxygen, sulfur and nitrogen; the ratio of x to y is in the range of between about 5:1 and about 100,000:1; the ratio of z to y is in the range of between about 0.0001:1 and about 0.35:1; and said polyester has a weight average molecular weight of at least about 60,000.

33. An aliphatic polyester in accordance with claim 31 wherein A is an alkylene containing 2 to about 8 carbon atoms; R is an alkylene or an alkenylene containing 2 to about 8 carbon atoms; the ratio of x to y is in the range of between about 10:1 and about 2,000:1; the ratio of z to y is in the range of between about 0.001:1 and about 0.2:1; and said polyester has a weight average molecular weight in the range of between about 40,000 and about 200,000.

34. An aliphatic polyester in accordance with claim 33 wherein A is an alkylene containing 2 to about 6 carbon atoms; R is an alkylene containing 2 to about 6 carbon atoms; and said polyester has a weight average molecular weight in the range of between about 60,000 and about 150,000.

35. An aliphatic polyester in accordance with claim 34 wherein A is ethylene; R is an alkylene containing 4 carbon atoms; and said polyester has a weight average molecular weight of between about 70,000 and about 125,000.

* * * * *

UNITED STATES PATENT AND TRADEMARK OFFICE
CERTIFICATE OF CORRECTION

PATENT NO. : 5,270,411
DATED : December 14, 1993
INVENTOR(S) : Biau-Hung Chang; Thomas S. Brima It is certified that error appears in the above-indentified patent and that said Letters Patent is hereby corrected as shown below:

Column 11:
Claim 1, line 10, "$R^1$ and $R^6$" should read --and $R^6$--.

Column 11:
Claim 10, line 3, "about carbon atoms." should read --about 4 carbon atoms.--

Column 14:
Claim 33, line 8, "40,000" should read --60,000--

Signed and Sealed this

Twelfth Day of July, 1994

Attest:

BRUCE LEHMAN

Attesting Officer    Commissioner of Patents and Trademarks